Apr. 17, 1923.
E. S. CHARLES
ENSILAGE CUTTER KNIFE ADJUSTMENT
Filed April 7, 1921
1,452,289
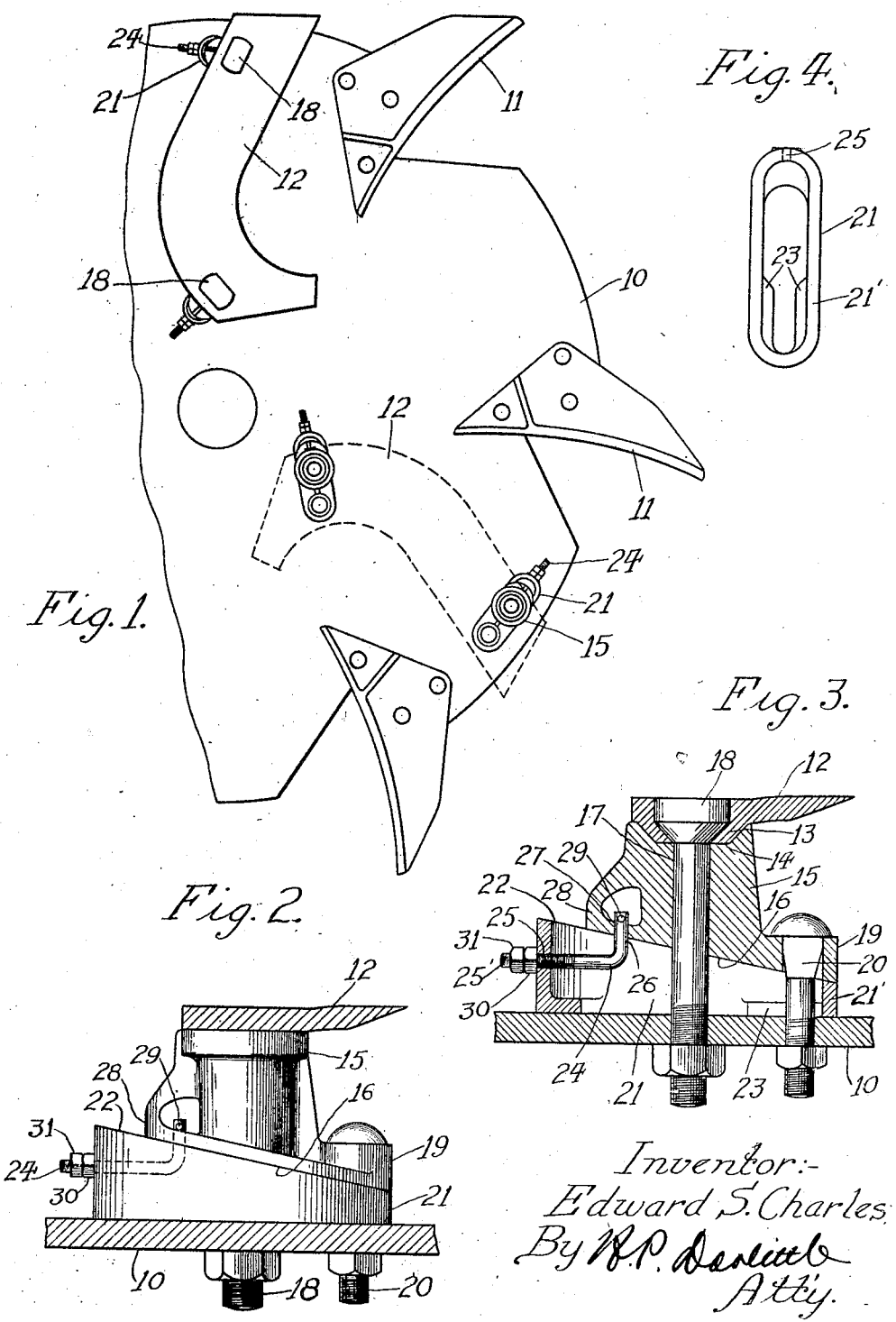
Inventor:-
Edward S. Charles
By W. P. Danitt
Atty.

Patented Apr. 17, 1923.

1,452,289

UNITED STATES PATENT OFFICE.

EDWARD S. CHARLES, OF BERWYN, ILLINOIS, ASSIGNOR TO INTERNATIONAL HARVESTER COMPANY, A CORPORATION OF NEW JERSEY.

ENSILAGE-CUTTER-KNIFE ADJUSTMENT.

Application filed April 7, 1921. Serial No. 459,263.

*To all whom it may concern:*

Be it known that I, EDWARD S. CHARLES, a citizen of the United States, residing at Berwyn, in the county of Cook and State of Illinois, have invented certain new and useful Improvements in Ensilage-Cutter-Knife Adjustments, of which the following is a full, clear, and exact specification.

My invention relates to an ensilage cutter and more particularly to the manner of mounting and adjusting the knives on the flywheel.

The object of my invention is to provide an improved adjustable knife mounting for the flywheel of an ensilage cutter.

A further object is to provide a simple and inexpensive device whereby a delicate adjustment of the knife may be had without entirely removing the bolts from the knife blade.

These and other objects are obtained by providing two oppositely disposed beveled members having an adjustable connection therebetween to effect an adjustment of the knife.

In the drawings, Fig. 1, is a plan view showing the manner in which the knives are mounted on the flywheel.

Fig. 2 is an enlarged elevational view of my adjustable mounting.

Fig. 3 is a cross sectional view of Figure 2, and

Fig. 4 is an enlarged plan view of the adjustable beveled member.

Like numerals of reference refer to like parts throughout the several views.

In carrying out my invention I employ the usual circular flywheel 10 only a portion of which is shown, provided with the usual fan blades 11 and having mounted at regular intervals a series of tangentially arranged cutting blades 12. These blades 12 are provided with forged countersunk bolt head portions 13 adapted to be secured in the seat 14 of a beveled member 15. The member 15 is provided with an aperture 17 extending vertically therethrough and registering with the aperture in the countersunk portion 13 of the blade 12 for receiving a securing bolt 18 for fixing the blade 12 to the flywheel 10. Additional means for firmly securing the blade 12 to the flywheel includes a forwardly extending ear 19 formed integrally on the front portion of the member 15. This ear 19 is adapted to receiving a second securing bolt 20.

My improved adjusting mechanism includes an adjustable wedge member 21 disposed between the flywheel 10 and the member 15. The wedge member 21 is provided with an inclined face 22 adapted to slidably engage the inclined face 16 of the member 15. The member 21 is made up of an encircling wall 21' having oppositely disposed ribs 23 at the base thereof and extending inwardly to engage the bolt 20 for preventing lateral displacement of the wedge member. The adjustable connection between the wedge member 21 and the member 15 comprises an L-shaped bolt 24, having one end 25' threaded and extending through an aperture 25 in the wedge member 21 and the other end 26 of said bolt extending through an aperture 27 which is formed in the rearwardly extending portion 28 of the member 15. The bolt 24 is secured to the member 15 by a cotter 29. The threaded portion 25 of the bolt 24 is provided with adjusting nut 30 and lock nut 31.

In the operation of adjusting the knife 12 upon the flywheel 10, the securing bolts 18 and 20 are loosened and the nuts 30 and 31 are adjusted in a manner to slide the wedge member 21 forwardly or rearwardly with respect to the member 15 and flywheel 10. In this connection it will be noted that the tightening or turning of the nuts 30 and 31 in a clockwise direction forces the wedge member 21 forwardly in a manner to position the blade 12 further away from the flywheel 10. When the proper adjustment is attained the securing bolts 18 and 20 are tightened to firmly fix the blades in the adjusted position.

From the above description it is readily seen that a simple and efficient adjustable knife mounting is provided and one in which it is unnecessary to remove the securing bolts to effect an adjustment of the knife blades.

While I have described but one embodiment which my invention may assume, it is to be understood that the same may be modified without departing from the spirit and scope of the appended claims.

What I claim and desire to secure by Letters Patent is:

1. In an ensilage cutter, a flywheel, a knife support mounted on said flywheel comprising a plurality of members, and means comprising an L-shaped bolt connecting said members for adjusting said support.

2. In an ensilage cutter, a flywheel, a knife support mounted on said flywheel comprising a plurality of members, one of said members movable with respect to the other member and having an encircling wall, and means extending through said wall for connecting said members for effecting an adjustment of said members.

3. In an ensilage cutter, a flywheel, a knife support mounted on said flywheel comprising a pair of oppositely disposed beveled members, and means extending through the beveled surfaces of said members for connecting and adjusting one of said members relative to the other member.

4. In an ensilage cutter, a flywheel, a knife, a pair of adjustable beveled surface members mounted on said flywheel for supporting said knife, a bolt extending through said knife, and members for securing said knife to said flywheel, a second bolt extending through said members for securing the same to said flywheel, and means extending through the beveled surfaces of said members for effecting an adjustment of said knife with respect to said flywheel.

5. In an ensilage cutter, a flywheel, a knife, a pair of adjustable members mounted on said flywheel for supporting said knife, a bolt extending through said knife and members for securing said knife to said flywheel, a second bolt extending through said members for securing the same to said flywheel and an L-shaped bolt disposed between said members for effecting an adjustment of said knife with respect to said flywheel.

In testimony whereof I affix my signature.

EDWARD S. CHARLES.